United States Patent
Okuda et al.

(10) Patent No.: US 12,463,827 B2
(45) Date of Patent: Nov. 4, 2025

(54) PROGRAM EXECUTION SYSTEM, DATA PROCESSING APPARATUS, PROGRAM EXECUTION METHOD, AND PROGRAM

(71) Applicant: NIPPON TELEGRAPH AND TELEPHONE CORPORATION, Tokyo (JP)

(72) Inventors: Tetsuya Okuda, Tokyo (JP); Misato Nakabayashi, Tokyo (JP)

(73) Assignee: NTT, Inc., Tokyo (JP)

( * ) Notice: Subject to any disclaimer, the term of this patent is extended or adjusted under 35 U.S.C. 154(b) by 59 days.

(21) Appl. No.: 18/705,174

(22) PCT Filed: Nov. 8, 2021

(86) PCT No.: PCT/JP2021/040997
§ 371 (c)(1),
(2) Date: Apr. 26, 2024

(87) PCT Pub. No.: WO2023/079743
PCT Pub. Date: May 11, 2023

(65) Prior Publication Data
US 2025/0016003 A1   Jan. 9, 2025

(51) Int. Cl.
*H04L 29/06* (2006.01)
*H04L 9/08* (2006.01)
*H04L 9/32* (2006.01)

(52) U.S. Cl.
CPC .......... *H04L 9/3247* (2013.01); *H04L 9/0822* (2013.01); *H04L 9/0825* (2013.01)

(58) Field of Classification Search
None
See application file for complete search history.

(56) References Cited

U.S. PATENT DOCUMENTS

| | | | | |
|---|---|---|---|---|
| 2014/0075199 A1* | 3/2014 | Hiwatari | ............... | H04L 9/3236 713/176 |
| 2015/0350197 A1* | 12/2015 | Ike | ......... | H04L 63/126 713/156 |
| 2022/0417002 A1* | 12/2022 | Esiner | ................... | H04L 9/0866 |

OTHER PUBLICATIONS

Microsoft Azure Confidential Computing Official Web Page https://docs.microsoft.com/ja-jp/azure/confidential-computing/overview, Retrieved Nov. 8, 2021.

(Continued)

*Primary Examiner* — Andrew J Steinle
(74) *Attorney, Agent, or Firm* — IPUSA, PLLC

(57) ABSTRACT

A program execution system including a data holding apparatus; a program providing apparatus; and a data processing apparatus that includes a mechanism for performing secret computing in a secure area is provided. The data holding apparatus transmits encrypted data of data D to the data processing apparatus, the program providing apparatus transmits an encrypted program of a program P to the data processing apparatus, the program providing apparatus transmits a secret key SKp to the data processing apparatus, the data processing apparatus generates a first signature by the secret key SKp on behalf of the program providing apparatus and transmits the first signature to the data holding apparatus, the data holding apparatus verifies the first signature and transmits a secret key SKd to the data processing apparatus, and the data processing apparatus computes, in the secure area, a result P(D) by executing the program P based on the data D.

6 Claims, 6 Drawing Sheets

(56) References Cited

OTHER PUBLICATIONS

Google Confidential VM Official Web Page https://cloud.google.com/compute/confidential-vm/docs?hl=ja, Retrieved Nov. 8, 2021.
George C. Necula, School of Computer Science Carnegie Mellon University, "Proof-Carrying Code", 1997, pp. 1-14.
George C. Necula and Peter Lee., Carnegie Mellon University, "Safe, Untrusted Agents using Proof-Carrying Code", 1998.
Yasuyuki Tsukada, Journal of Information Processing, "Proof Hiding in Interactive Proof-carrying Code and Its Applications", vol. 46 No. 1, Jan. 2005, pp. 236-246.

* cited by examiner

PROGRAM EXECUTION SYSTEM, DATA PROCESSING APPARATUS, PROGRAM EXECUTION METHOD, AND PROGRAM

TECHNICAL FIELD

The present invention relates to a confidentiality protection technique in the information and communication field.

BACKGROUND ART

As techniques in the related art that perform computing while keeping data and programs confidential from cloud providers, for example, confidential computing (Non Patent Literature 1) and confidential VM (Non Patent Literature 2) are disclosed. By these techniques, for example, it is possible to isolate and keep highly confidential data secret while processing the data in a cloud.

However, in these techniques in the related art, in a case where different users hold data and programs, a risk that the data and the programs leak to the users is not considered.

CITATION LIST

Non Patent Literature

Non Patent Literature 1: Microsoft Azure Confidential Computing Official Web Page https://docs.microsoft.com/ja-jp/azure/confidential-computing/overview Non Patent Literature 2: Google Confidential VM Official Web Page https://cloud.google.com/compute/confidential-vm/docs?hl=ja

SUMMARY OF INVENTION

Technical Problem

The present invention has been made in view of the above aspects, and an object of the present invention is to provide a technique for preventing data leakage to a program provider and program leakage to a data holder in a case where a data processing apparatus including a confidential computing mechanism processes data held by the data holder according to a program provided by the program provider.

Solution to Problem

According to the disclosed technique, there is provided a program execution system including: a data holding apparatus; a program providing apparatus; and a data processing apparatus that includes a mechanism for performing secret computing in a secure area. The data holding apparatus transmits encrypted data obtained by encrypting data D with a public key PKd of the data holding apparatus to the data processing apparatus, the program providing apparatus transmits an encrypted program obtained by encrypting a program P with a public key PKp of the program providing apparatus to the data processing apparatus, the program providing apparatus transmits a secret key SKp encrypted by a first shared key that is shared with the data processing apparatus to the data processing apparatus, the data processing apparatus generates a first signature by the secret key SKp on behalf of the program providing apparatus and transmits the generated first signature to the data holding apparatus, the data holding apparatus verifies the first signature by using the public key PKp and transmits a secret key SKd encrypted by a second shared key that is shared with the data processing apparatus to the data processing apparatus, and the data processing apparatus computes, in the secure area, a result P(D) by executing the program P, obtained by decrypting the encrypted program with the secret key SKp, based on the data D obtained by decrypting the encrypted data with the secret key SKd.

Advantageous Effects of Invention

According to the technique disclosed in the present invention, there is provided a technique for preventing data leakage to a program provider and program leakage to a data holder in a case where a data processing apparatus including a confidential computing mechanism processes data held by the data holder according to a program provided by the program provider.

DESCRIPTION OF EMBODIMENTS

Hereinafter, an embodiment of the present invention (present embodiment) will be described with reference to the drawings. The embodiment to be described below is merely an example, and embodiments to which the present invention is applied are not limited to the following embodiment. Note that, in the description below, a program is denoted by P, data to be processed according to P is denoted by D, and a result of processing of D according to P is denoted by P(D).

(System Configuration)

Figure 1:
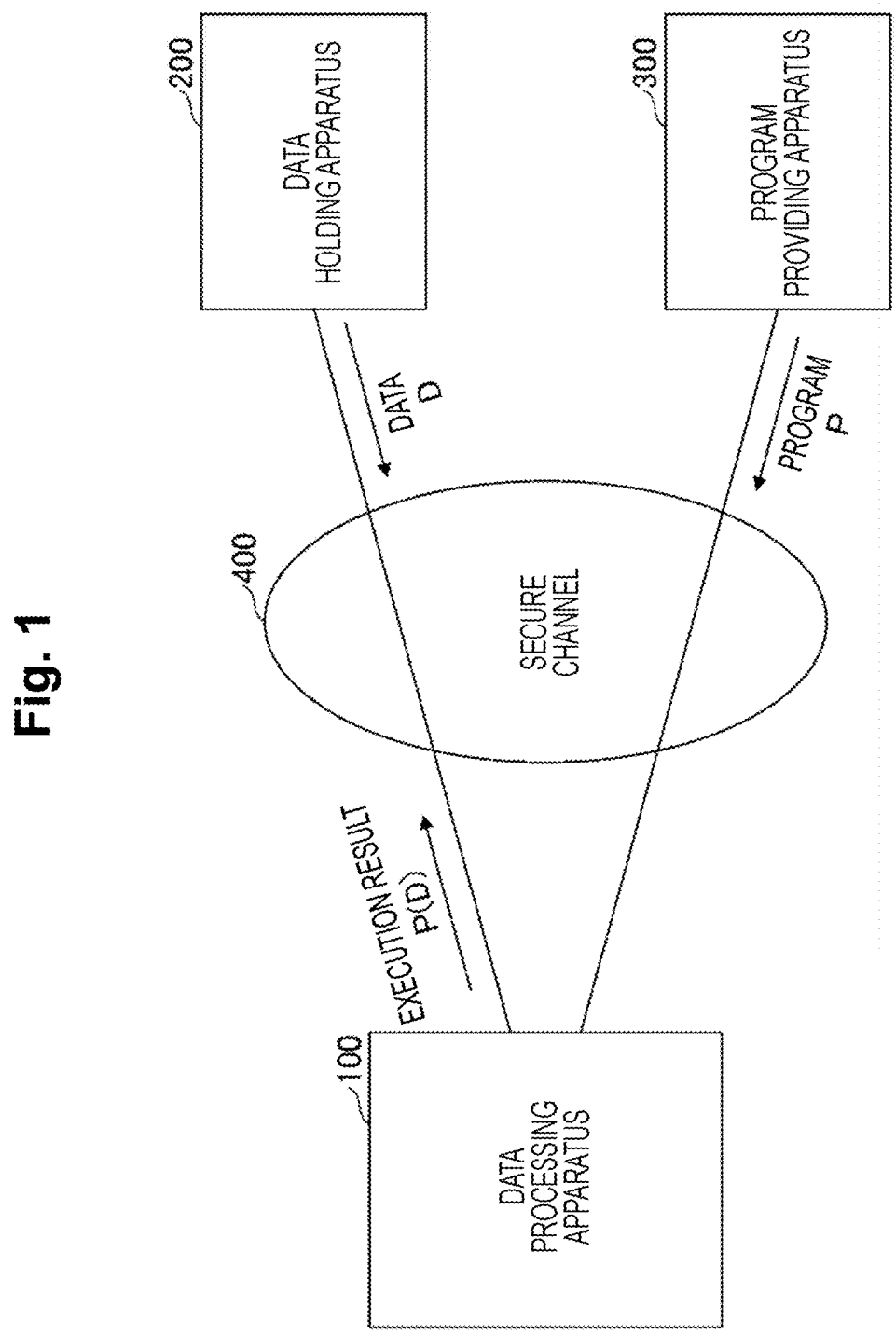
FIG. 1 is a diagram illustrating a system configuration example according to an embodiment of the present invention.

FIG. 1 illustrates a configuration example of a program execution system according to an embodiment of the present invention. As illustrated in FIG. 1, the program execution system according to the present embodiment includes a data processing apparatus 100, a data holding apparatus 200, and a program providing apparatus 300.

Each of the data processing apparatus 100, the data holding apparatus 200, and the program providing apparatus 300 may be a physical machine (a computer), or may be a virtual machine in a cloud. Alternatively, each of the data holding apparatus 200 and the program providing apparatus 300 may be a function (for example, a web browser) that operates in a physical machine or a virtual machine. Further, the data processing apparatus 100 may be a system including a plurality of physical machines (in particular, in Example 2 to be described later, two containers in which two application programs APP_PE and APP_PV respectively operate may be generated on different physical machines).

In the present embodiment, the data processing apparatus 100 includes a secret computing mechanism or a confidential computing mechanism by applying a function that is for performing data processing separately from an existing OS and is called a trusted execution environment (TEE) function. In the present embodiment, for example, SEV of AMD (registered trademark) is assumed as the TEE function. However, this is merely an example, and the present invention can be applied to any TEE function. For example, the present invention can also be applied to SGX and TDX of Intel (registered trademark), TrustZone (registered trademark) and ARM Confidential Compute Architecture of Arm (registered trademark), and the like.

As illustrated in FIG. 1, a secure channel 400 is built between the data processing apparatus 100 and the data holding apparatus 200 and between the data processing apparatus 100 and the program providing apparatus 300, and data and programs can be safely transmitted and received. For example, this secure channel is built by a remote authentication protocol called remote attestation in SEV. However, this is merely an example, and the secure channel may be built by any means.

In the present embodiment, a program P is transmitted from the program providing apparatus 300 to the data processing apparatus 100, and data D is transmitted from the data holding apparatus 200 to the data processing apparatus 100. The data processing apparatus 100 processes the data D according to the program P, and provides an execution result P(D) to the data holding apparatus 200.

With the secret computing mechanism, the data processing apparatus 100 does not leak the program P and the data D to the outside of a secure area (for example, to a cloud in which the data processing apparatus 100 is operating). The present embodiment provides not only this mechanism, but also a mechanism in which the program P does not leak to the data holding apparatus 200 and the data D does not leak to the program providing apparatus 300.

Accordingly, in the program execution system according to the present embodiment, in a use case where the secret computing mechanism is applied to data distribution, the data holder (the data holding apparatus 200) having the highly confidential data D and the program author (the program providing apparatus 300) having the highly confidential program P can combine and execute the data and the program while keeping the data and the program secret from each other.

Configuration Example of Data Processing Apparatus

Figure 2:
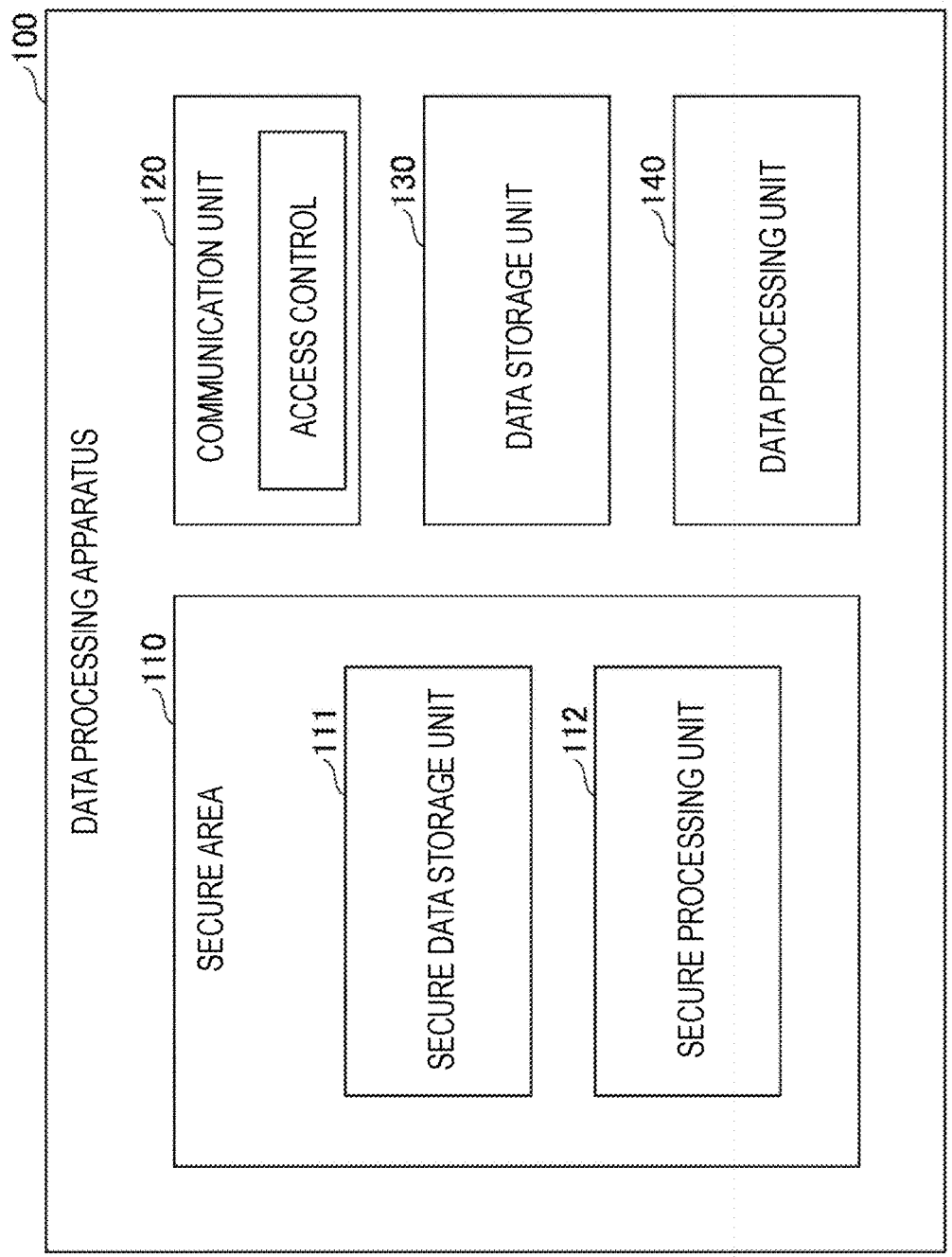
FIG. 2 is a diagram illustrating a functional configuration example of a data processing apparatus.

FIG. 2 illustrates a functional configuration example of the data processing apparatus 100. As illustrated in FIG. 2, the data processing apparatus 100 includes a secure area 110 that is a protected area in which confidentiality is maintained, a communication unit 120 that performs data communication with another apparatus (for example, the data holding apparatus 200, the program providing apparatus 300, or the like), a data storage unit 130 that stores data in a storage or the like outside the secure area 110, and a data processing unit 140 that performs various types of data processing outside the secure area 110.

The content of the data and the program in the secure area 110 cannot be known from the outside. Outside the secure area 110, normal data storing and data processing (program execution) can be respectively performed by the data storage unit 130 and the data processing unit 140. The communication unit 120 can also perform data communication and access control in data communication.

In the secure area 110, it is possible to perform data storing and data processing (program execution) while maintaining confidentiality. FIG. 2 illustrates a secure data storage unit 111 and a secure processing unit 112 as functional units that perform data storing and data processing in the secure area 110. The secure data storage unit 111 stores various data in a storage area while maintaining confidentiality in the secure area 110. In addition, the secure processing unit 112 performs data processing (for example, start and execution of P, generation (computing) of a common key, encryption, decryption, signature verification, and the like) in the secure area 110.

The secure area 110 can be formed by an existing technique. Any technique may be used as an existing technique for forming the secure area 110. For example, the secure area 110 may be formed as a separate chip independent of a main CPU and a main memory in terms of hardware, or the secure area 110 may be formed in terms of software by an encryption technique and an authentication technique. An example of a technique for forming the secure area 110 in terms of software is SEV described above. In the present embodiment, SEV is used as an example. In this case, the secure area 110 is generated as an encrypted container in the data processing apparatus 100. Note that, for example, in a case where a plurality of encrypted containers are generated, a plurality of secure areas 110 exist. In this case, the plurality of secure areas 110 are denoted as a secure area 110-1, a secure area 110-2, and the like.

Figure 3:
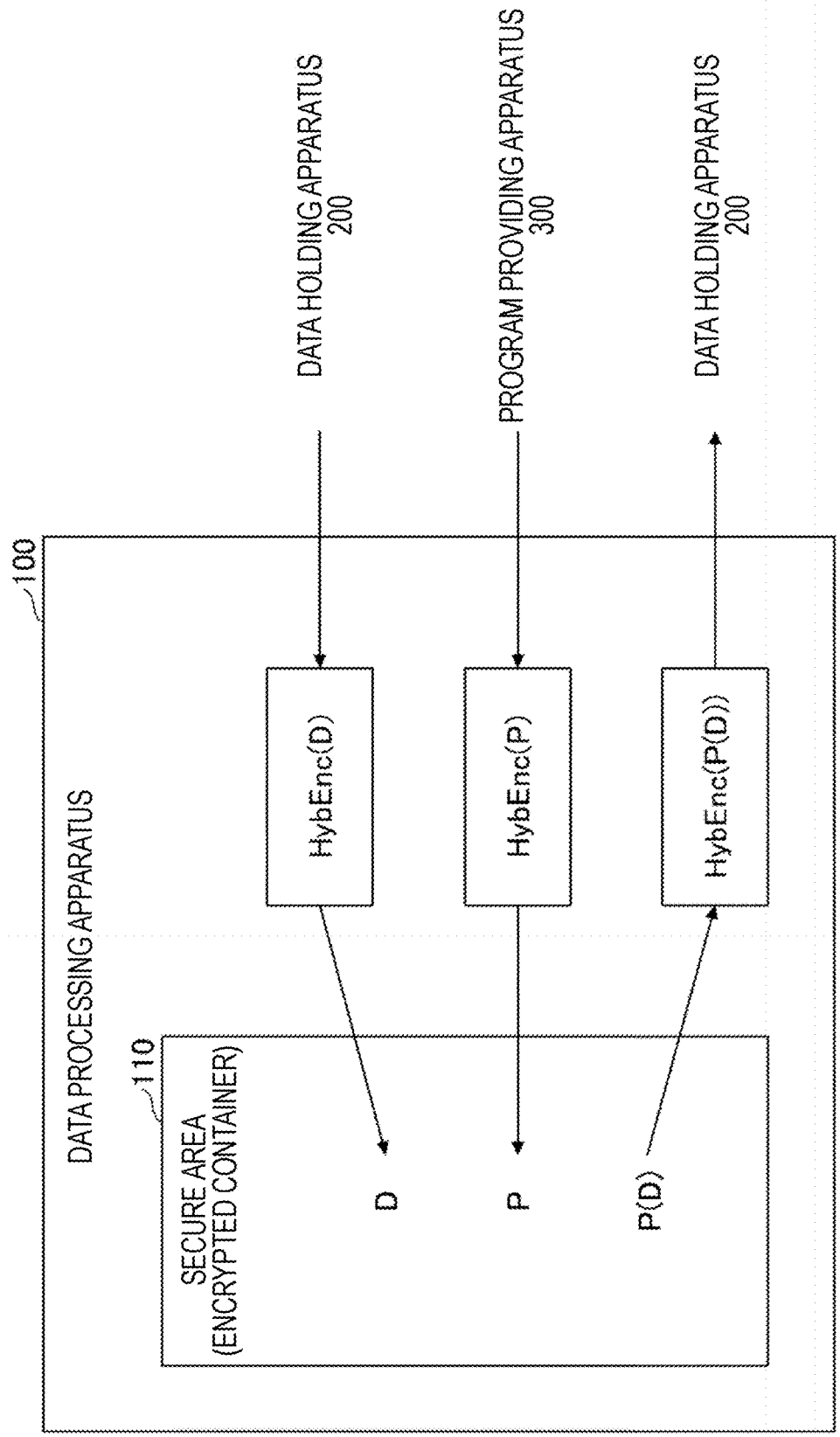
FIG. 3 is a diagram illustrating an image of processing in a secure area.

FIG. 3 illustrates an image of data processing in the secure area 110. Note that, in the present embodiment, "HybEnc" means encryption by a public-key-based encryption method, and "Enc" means encryption by a common-key-based encryption method. For example, HybEnc(D) means encrypted data.

As illustrated in FIG. 3, the data processing apparatus 100 receives HybEnc(D) from the data holding apparatus 200, and receives HybEnc(P) from the program providing apparatus 300.

In the secure area 110, HybEnc(D) and HybEnc(P) are decrypted, and thus D and P are obtained. Further, in the secure area 110, P(D) is computed, and HybEnc(P(D)) is further computed. HybEnc(P(D)) is transmitted to the data holding apparatus 200.

At this time, in Example 1 to be described later, a mechanism is introduced in which the program providing apparatus 300 deposits its own signature key (secret key) in the secure area 110, the data processing apparatus 100 performs signature on behalf of the program providing apparatus 300 before computing P(D), and the data holding apparatus 200 verifies the signature. Thereby, the program author (the program providing apparatus 300) is guaranteed. For example, it is possible to prevent a situation where D is restored from P'(D) by execution of an illegal program P' and this results in leakage of D. Further, a nonce generated by the data processing apparatus 100 is used when the data processing apparatus 100 performs the signature by proxy as described above, and thus a replay attack can also be prevented.

In addition, in Example 2 to be described later, a mechanism called proof-carrying code (PCC) is further introduced, that is, a mechanism for verifying that there is no illegality in the program P itself is introduced. Accordingly, it is guaranteed that specific processing is not executed by the program P. For example, it is possible to prevent a situation where processing that is not expected by the data holder (the data holding apparatus 200) (for example, unexpected data transmission, data storing, or the like) is executed.

In this manner, a mechanism in which the program P does not leak to the data holding apparatus 200 and the data D does not leak to the program providing apparatus 300 is realized by a combination of computing in the secure area 110 and encryption communication.

Hereinafter, Example 1 and Example 2 will be described as examples of processing flows in the present embodiment.

In each of the Examples to be described below, it is assumed that a remote attestation mechanism is used in generating (sharing) a common key. More specifically, a protocol, in which a mechanism for mutually authenticating a user (the data holding apparatus 200 and the program providing apparatus 300) and a container is applied to an elliptic curve Diffie-Hellman key exchange (ECDHKE) protocol, is used. In the present embodiment, this is referred to as ECDHE with mutual authentication.

In the authentication of the container, a third-party verification organization (for example, AMD verification service) intervenes. However, processing of generating a common key with the third-party verification organization's intervention is an existing technique called remote attestation. Therefore, in the description of Example 1 and Example 2, only an outline of the processing related to remote attestation is described, and parts related to the present invention are described in detail.

In the following description, APP, APP_PE, and APP_PV are application programs that operate on a container, and are published as OSS. The program P is executed on APP or APP_PE. Further, APP_PE includes a PCC computing program, and APP_PV includes a PCC verification program. The PCC computing program is a program that creates proof information PROOF(P) indicating that the program P satisfies a specific requirement (for example, a requirement that specific processing is not executed in the program P, or the like), and the PCC verification program is a program that verifies whether or not PROOF(P) is correct. Note that for details of PCC, refer to, for example, Reference Literature 1 to Reference Literature 3, and the like.

In addition, PKp and SKp are a public key and a secret key of the program providing apparatus 300, respectively. PKd and SKd are a public key and a secret key of the data holding apparatus 200, respectively. Further, HybEnc(A, B) means information obtained by encrypting A with B (a public key), and Enc(A, B) means information obtained by encrypting A with B (a common key). H(A) means a hash value of A. Sig(A, B) means a signature for A by B (a secret key). MAC(A, B) means a message authentication code for A using B (a common key).

In addition, in the following description, it is assumed that there is no replacement of the program operating on the container after the container is started. Thereby, for example, it is guaranteed that there is no illegality, such as returning of an execution result of a program B while presenting an proof of execution of a program A.

Example 1

Figure 4:
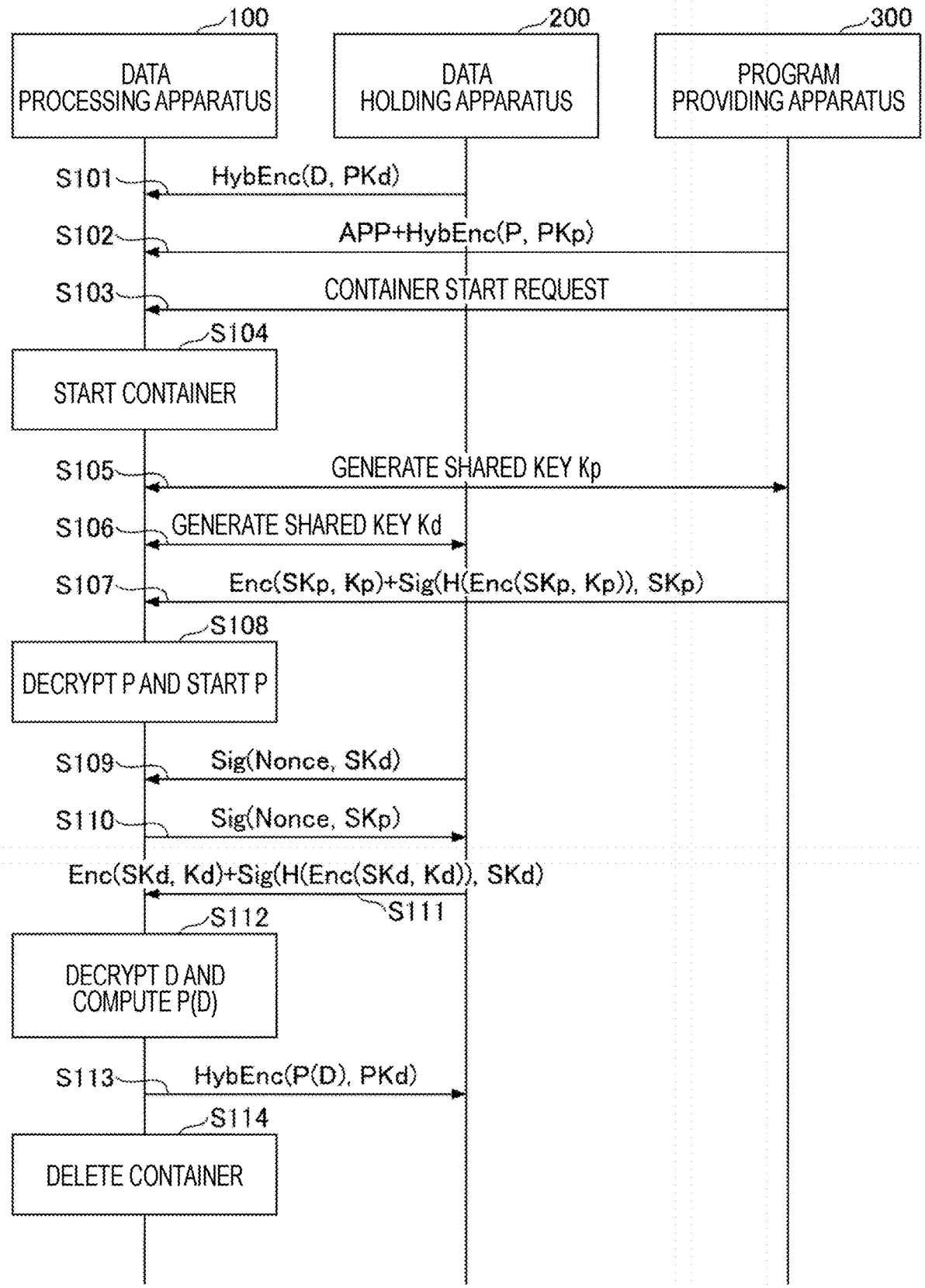
FIG. 4 is a sequence diagram illustrating a flow of processing in Example 1.

First, Example 1 will be described with reference to FIG. 4. The processing flow of FIG. 4 is based on an assumption that the data holding apparatus 200 holds D, PKd, and SKd and the program providing apparatus 300 holds APP, P, PKp, and SKp.

In S101, the data holding apparatus 200 transmits HybEnc (D, PKd) to the data processing apparatus 100. HybEnc(D, PKd) is stored in a public storage area such as a storage of the data processing apparatus 100 by the data storage unit 130.

In S102, the program providing apparatus 300 transmits APP and HybEnc(P, PKp) to the data processing apparatus 100. APP and HybEnc(P, PKp) are stored in a public storage area such as a storage of the data processing apparatus 100 by the data storage unit 130. Note that APP and HybEnc(P, PKp) are also registered in a third-party verification organization by the program providing apparatus 300, and are published.

In S103, the program providing apparatus 300 transmits a container start request for operating APP to the data processing apparatus 100.

In S104, the data processing apparatus 100 generates a container for operating APP, starts the container, and encrypts the container. Thereby, the encrypted container (secure area 110) on which APP operates is generated. Hereinafter, the generated container is referred to as an "APP container" for convenience.

In S105, the APP container of the data processing apparatus 100 and the program providing apparatus 300 each generate (compute) a shared key Kp by the ECDHE with mutual authentication. At this time, the APP container of the data processing apparatus 100 authenticates the user (the program providing apparatus 300) by using PKp to verify the signature by SKp, and the program providing apparatus 300 authenticates the APP container of the data processing apparatus 100 by verifying, via a third-party verification organization, the hash value H(APP+HybEnc(P, PKp)) from the APP container of the data processing apparatus 100. Note that H(APP+HybEnc(P, PKp)) represents a hash value of data obtained by combining APP and HybEnc(P, PKp), and is, for example, a hash value of data obtained by connecting bit strings of APP and HybEnc(P, PKp).

In S106, the APP container of the data processing apparatus 100 and the data holding apparatus 200 each generate (compute) a shared key Kd by the ECDHE with mutual authentication. At this time, the APP container of the data processing apparatus 100 authenticates the user (the data holding apparatus 200) by using PKd to verify the signature by SKd, and the data holding apparatus 200 authenticates the APP container of the data processing apparatus 100 by verifying, via a third-party verification organization, the hash value H(APP+HybEnc(P, PKp)) from the APP container of the data processing apparatus 100.

In S107, the program providing apparatus 300 transmits Enc(SKp, Kp) and Sig(H(Enc(SKp, Kp)), SKp) to the APP container of the data processing apparatus 100. Note that, at this time, the program providing apparatus 300 may further transmit Enc(PKd-list, Kp) and Sig(Enc(PKd-list, Kp), SKp) to the APP container of the data processing apparatus 100. Here, the PKd-list is a list of public keys of the data holder (the data holding apparatus 200) for which the program providing apparatus 300 permits execution of the program P.

Here, the PKd-list may be transmitted to the APP container in processing before S107. For example, the PKd-list may be transmitted to the APP container in S105 described above.

In S108, the APP container of the data processing apparatus 100 verifies Sig(H(Enc(SKp, Kp)), SKp) by using PKp. In a case where the verification is successful, the APP container of the data processing apparatus 100 decrypts Enc(SKp, Kp) with Kp and extracts SKp. Thereby, the secret key (signature key) SKp of the program providing apparatus 300 is deposited in the APP container. Further, the APP container of the data processing apparatus 100 decrypts HybEnc(P, PKp) with SKp, extracts P, and starts P on the APP container. Note that SKp is stored in a secure storage area by the secure data storage unit 111. In addition, P is started by the secure processing unit 112.

In S109, the data holding apparatus 200 transmits Sig (Nonce, SKd) to the APP container of the data processing apparatus 100. Note that Nonce means a nonce value.

In S110, the APP container of the data processing apparatus 100 verifies Sig(Nonce, SKd) by using the public key PKd included in the PKd-list decrypted from Enc(PKd-list, Kp) by Kp, and transmits Sig(Nonce, SKp) to the data holding apparatus 200 in a case where the verification is successful. Sig(Nonce, SKp) means that the APP container of the data processing apparatus 100 performs signature of the program author (the program providing apparatus 300) on behalf of the program author.

In S111, the data holding apparatus 200 verifies Sig (Nonce, SKp) by using the public key PKp included in a PKp-list held by the data holding apparatus 200, and transmits Enc(SKd, Kd) and Sig(H(Enc(SKd, Kd)), SKd) to the APP container of the data processing apparatus 100 in a case where the verification is successful. Here, the PKp-list is a list of public keys of the program author (the program providing apparatus 300) for which the data holding apparatus 200 permits execution of the program P.

In S112, the APP container of the data processing apparatus 100 verifies Sig(H(Enc(SKd, Kd)), SKd) by using PKd. In a case where the verification is successful, the APP container of the data processing apparatus 100 decrypts Enc(SKd, Kd) with Kd and extracts SKd. In addition, the APP container of the data processing apparatus 100 decrypts HybEnc(D, PKd) with SKd, extracts D, and computes P(D).

In S113, the APP container of the data processing apparatus 100 transmits HybEnc(P(D), PKd) to the data holding apparatus 200. Thereby, the data holding apparatus 200 can decrypt HybEnc(P(D), PKd) with SKd, and extract P(D).

In S114, the data processing apparatus 100 deletes the APP container. In addition, at this time, the data processing apparatus 100 notifies the data holding apparatus 200 that the APP container is deleted.

Note that, in the processing flow, the communication unit 120 of the data processing apparatus 100 may block communication other than the communication by the secure area 110 related to P or D. Particularly, downloading communication with apparatuses other than the data holding apparatus 200 may be blocked.

According to Example 1, it is possible to provide the execution result P(D) to the data holder (the data holding apparatus 200) without the program author (the program providing apparatus 300) knowing D and P(D), while keeping P and D confidential from the data processing apparatus 100 and keeping P confidential from the data holder (the data holding apparatus 200), mainly from the viewpoint of the program author (the program providing apparatus 300). Further, it is guaranteed that the program author is an expected program author to the data holder (the data holding apparatus 200).

Example 2

Figure 5:
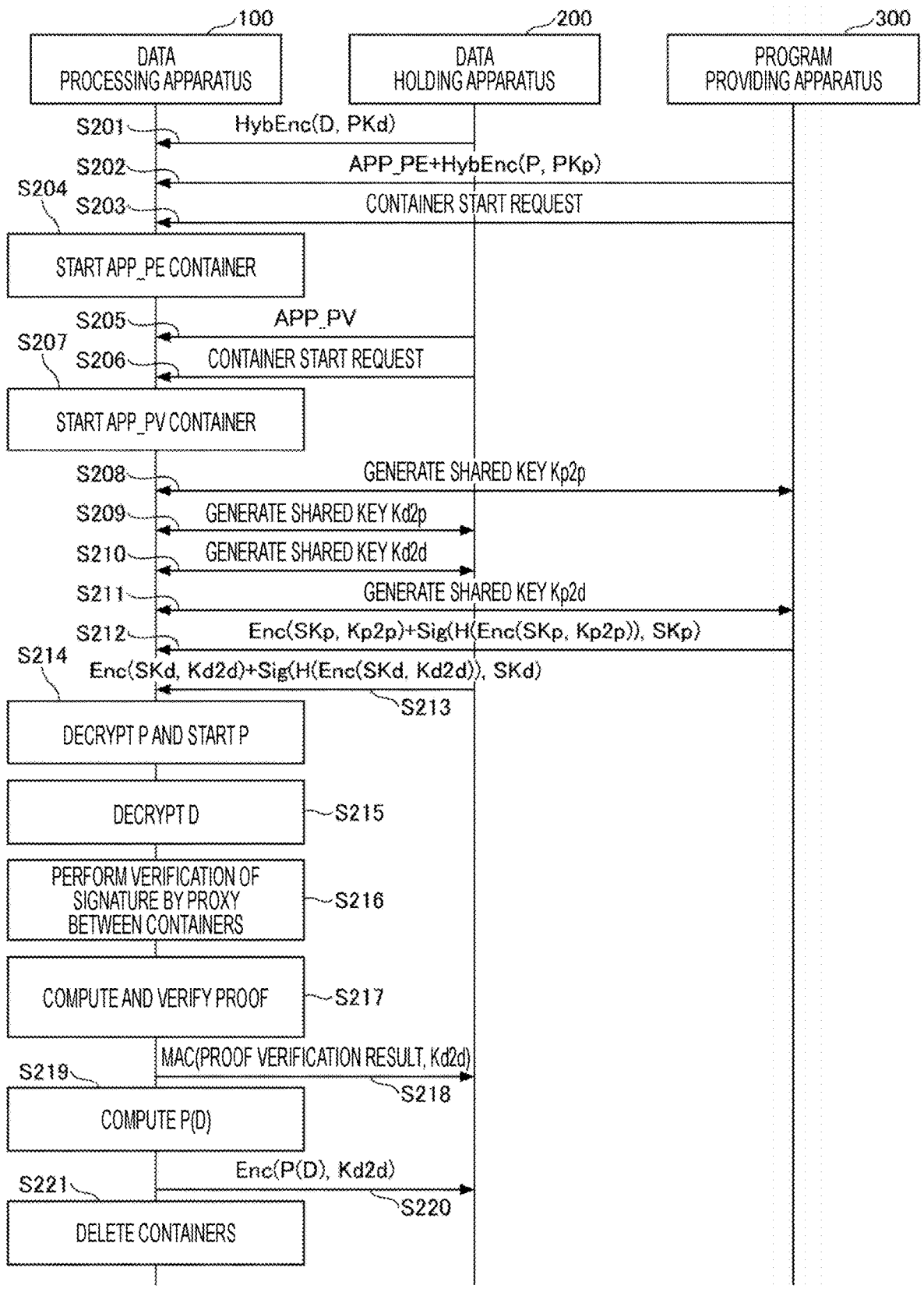
FIG. 5 is a sequence diagram illustrating a flow of processing in Example 2.

Next, Example 2 will be described with reference to FIG. 5. The processing flow of FIG. 5 is based on an assumption that the data holding apparatus 200 holds APP_PV, D, PKd, and SKd and the program providing apparatus 300 holds APP_PE, P, PKp, and SKp.

In S201, the data holding apparatus 200 transmits HybEnc (D, PKd) to the data processing apparatus 100. HybEnc(D, PKd) is stored in a public storage area such as a storage of the data processing apparatus 100 by the data storage unit 130.

In S202, the program providing apparatus 300 transmits APP_PE and HybEnc(P, PKp) to the data processing apparatus 100. APP_PE and HybEnc(P, PKp) are stored in a public storage area such as a storage of the data processing apparatus 100 by the data storage unit 130. Note that APP_PE and HybEnc(P, PKp) are also registered in a third-party verification organization by the program providing apparatus 300, and are published.

In S203, the program providing apparatus 300 transmits a container start request for operating APP_PE to the data processing apparatus 100.

In S204, the data processing apparatus 100 generates a container for operating APP_PE, starts the container, and encrypts the container. Thereby, the encrypted container (secure area 110-1) on which APP_PE operates is generated. Hereinafter, the generated container is referred to as an "APP_PE container" for convenience.

In S205, the data holding apparatus 200 transmits APP_PV to the data processing apparatus 100. APP_PV is stored in a public storage area such as a storage of the data processing apparatus 100 by the data storage unit 130. In S206, the data holding apparatus 200 transmits a container start request for operating APP_PV to the data processing apparatus 100.

In S207, the data processing apparatus 100 generates a container for operating APP_PV, starts the container, and encrypts the container. Thereby, the encrypted container (secure area 110-2) on which APP_PV operates is generated. Hereinafter, the generated container is referred to as an "APP_PV container" for convenience.

In S208, the APP_PE container of the data processing apparatus 100 and the program providing apparatus 300 each generates (computes) a shared key Kp2p by the ECDHE with mutual authentication. At this time, the APP_PE container of the data processing apparatus 100 authenticates the user (the program providing apparatus 300) by using PKp to verify the signature by SKp, and the program providing apparatus 300 authenticates the APP_PE container of the data processing apparatus 100 by verifying, via a third-party verification organization, the hash value H(APP_PE+HybEnc(P, PKp)) from the APP_PE container of the data processing apparatus 100.

In S209, the APP_PE container of the data processing apparatus 100 and the data holding apparatus 200 each generate (compute) a shared key Kd2p by the ECDHE with mutual authentication. At this time, the APP_PE container of the data processing apparatus 100 authenticates the user (the data holding apparatus 200) by using PKd to verify the signature by SKd, and the data holding apparatus 200 authenticates the APP_PE container of the data processing apparatus 100 by verifying, via a third-party verification organization, the hash value H(APP_PE+HybEnc(P, PKp)) from the APP_PE container of the data processing apparatus 100.

In S210, the APP_PV container of the data processing apparatus 100 and the data holding apparatus 200 each generate (compute) a shared key Kd2d by the ECDHE with mutual authentication. At this time, the APP_PV container of the data processing apparatus 100 authenticates the user (the data holding apparatus 200) by using PKd to verify the signature by SKd, and the data holding apparatus 200 authenticates the APP_PV container by verifying, via a third-party verification organization, the hash value H(APP_PV) from the APP_PV container of the data processing apparatus 100.

In S211, the APP_PV container of the data processing apparatus 100 and the program providing apparatus 300 each generate (compute) a shared key Kp2d by the ECDHE with mutual authentication. At this time, the APP_PV container of the data processing apparatus 100 authenticates the user (the program providing apparatus 300) by using PKp to verify the signature by SKp, and the program providing apparatus 300 authenticates the APP_PV container of the data processing apparatus 100 by verifying, via a third-party verification organization, the hash value H(APP_PV) from the APP_PV container of the data processing apparatus 100.

In S212, the program providing apparatus 300 transmits Enc(SKp, Kp2p) and Sig(H(Enc(SKp, Kp2p)), SKp) to the APP_PE container of the data processing apparatus 100. Note that, at this time, the program providing apparatus 300 may further transmit Enc(PKd-list, Kp2p) and Sig(Enc (PKd-list, Kp2p), SKp) to the APP_PE container of the data processing apparatus 100. Here, the PKd-list is a list of public keys of the data holder (the data holding apparatus 200) for which the program providing apparatus 300 permits execution of the program P.

Here, the PKd-list may be transmitted to the APP_PE container in processing before S212. For example, the PKd-list may be transmitted to the APP_PE container in S208 described above.

In S213, the data holding apparatus 200 transmits Enc (SKd, Kd2d) and Sig(H(Enc(SKd, Kd2d)), SKd) to the APP_PV container of the data processing apparatus 100. Note that, at this time, the data holding apparatus 200 may further transmit Enc(PKp-list, Kd2d) and Sig(Enc(PKp-list, Kd2d), SKd) to the APP_PV container of the data processing apparatus 100. Here, the PKp-list is a list of public keys of the program author (the program providing apparatus 300) for which the data holding apparatus 200 permits execution of the program P.

Here, the PKp-list may be transmitted to the APP_PV container in processing before S213. For example, the PKp-list may be transmitted to the APP_PV container in S210 described above.

In S214, the APP_PE container of the data processing apparatus 100 verifies Sig(H(Enc(SKp, Kp2p)), SKp) by using PKp. In a case where the verification is successful, the APP_PE container of the data processing apparatus 100 decrypts Enc(SKp, Kp2p) by Kp2p and extracts SKp. Thereby, the secret key (signature key) SKp of the program providing apparatus 300 is deposited in the APP_PE container. Further, the APP_PE container of the data processing apparatus 100 decrypts HybEnc(P, PKp) with SKp, extracts P, and starts P on the APP_PE container. Note that SKp is stored in a secure storage area by the secure data storage unit 111. In addition, P is started by the secure processing unit 112.

In S215, the APP_PV container of the data processing apparatus 100 verifies Sig(H(Enc(SKd, Kd2d)), SKd) by using PKd. In a case where the verification is successful, the APP_PV container of the data processing apparatus 100 decrypts Enc(SKd, Kd2d) with Kd2d and extracts SKd. In addition, the APP_PV container of the data processing apparatus 100 decrypts HybEnc(D, PKd) with SKd, and extracts D.

In S216, the APP_PE container and the APP_PV container of the data processing apparatus 100 each generate (compute) a shared key Kta2ta by the ECDHE with mutual authentication. At this time, the APP_PE container performs signature by SKp on behalf of the program author (the program providing apparatus 300), and transmits the signature and the hash value H(APP_PE+HybEnc(P, PKp)) to the APP_PV container. In addition, the APP_PV container authenticates the program author (the program providing apparatus 300) and the APP_PE container by verifying the signature with the public key PKp included in the PKp-list, and verifying the hash value H(APP_PE+HybEnc(P, PKp)) via a third-party verification organization. On the other hand, the APP_PV container performs signature by SKd on behalf of the data holder (the data holding apparatus 200), and transmits the signature and the hash value H(APP_PV) to the APP_PE container. In addition, the APP_PE container authenticates the data holder (the data holding apparatus 200) and the APP_PV container by verifying the signature with the public key PKd included in the PKd-list, and verifying the hash value H(APP_PV) via a third-party verification organization.

As described above, the APP_PE container and the APP_PV container mutually authenticate each other, and also mutually authenticate the data holder and the program author on behalf of the program author and the data holder.

In S217, the APP_PE container of the data processing apparatus 100 computes PROOF(P) and transmits PROOF (P) and P to the APP_PV container. On the other hand, the APP_PV container verifies whether or not PROOF(P) is correct from PROOF(P) and P. This verification result is referred to as a "PROOF verification result". Note that the APP_PE container may compute PROOF(P) in advance.

In S219, the APP_PV container of the data processing apparatus 100 transmits MAC(PROOF verification result, Kd2d) to the data holding apparatus 200. Thereby, the data holder (the data holding apparatus 200) can recognize whether or not the PROOF verification result indicates that PROOF(P) is correct.

In S219, in a case where the PROOF verification result indicates that PROOF(P) is correct, the APP_PV container of the data processing apparatus 100 transmits Enc(D, Kta2ta) to the APP_PE container. In addition, the APP_PE container decrypts Enc(D, Kta2ta) with Kta2ta, extracts D, and then computes P(D).

In S220, the APP_PE container of the data processing apparatus 100 transmits Enc(P(D), Kta2ta) to the APP_PV container. In addition, the APP_PV container decrypts Enc (P(D), Kta2ta) with Kta2ta, extracts P(D), and then transmits Enc(P(D), Kd2d) to the data holding apparatus 200. Thereby, the data holding apparatus 200 can decrypt Enc(P (D), Kd2d) with Kd2d, and extract P(D).

In S221, the data processing apparatus 100 deletes the APP_PE container and the APP_PV container. Further, at this time, the data processing apparatus 100 notifies the program providing apparatus 300 that the APP_PE container is deleted, and notifies the data holding apparatus 200 that the APP_PV container is deleted.

According to Example 2, it is possible to provide the execution result P(D) to the data holder (the data holding apparatus 200) without the program author (the program providing apparatus 300) knowing D and P(D), while keeping P and D confidential from the data processing apparatus 100 and keeping P confidential from the data holder (the data holding apparatus 200), mainly from the viewpoint of the program author (the program providing apparatus 300). Further, in addition to the guarantee that the program author is an expected program author, the program P to be executed and "legality" of P are guaranteed to the data holder (the data holding apparatus 200).

Supplement to Example 1 and Example 2

As described above, each container (each of the APP container, the APP_PE container, and the APP_PV container) performs signature by using the signature key of the user (the data holder or the program author, or both) on behalf of the user.

The program P may be, for example, an artificial intelligence (AI) program or the like including a deep neural network (DNN) or the like. In this case, by performing code sign on the AI using the signature key of each user, it is also possible to clearly indicate which user's AI has authority.

The AI may be read as digital twin. In this case, the Example 1 and the Example 2 can also be said to be mechanisms for mutual authentication and access control between digital twins.

The correspondence relationship between the decryption keys of the program P and the data D and the signature key of each user is arbitrary. As an example, a key for decrypting the program P may be used as a signature key, and the signature key may be used to perform signature.

Hardware Configuration Example

It is possible to implement all of the data processing apparatus 100, the data holding apparatus 200, and the program providing apparatus 300, by causing a computer to execute a program, for example. This computer may be a physical computer, or may be a virtual machine in a cloud. The data processing apparatus 100, the data holding apparatus 200, and the program providing apparatus 300 are collectively referred to as the "apparatus".

Specifically, the apparatus can be implemented by executing a program corresponding to the processing to be performed in the apparatus, using hardware resources such as a CPU and a memory provided in the computer. The program can be stored and distributed by being recorded in a computer-readable recording medium (portable memory or the like). In addition, the program can also be provided through a network such as the Internet or an electronic mail.

Figure 6:
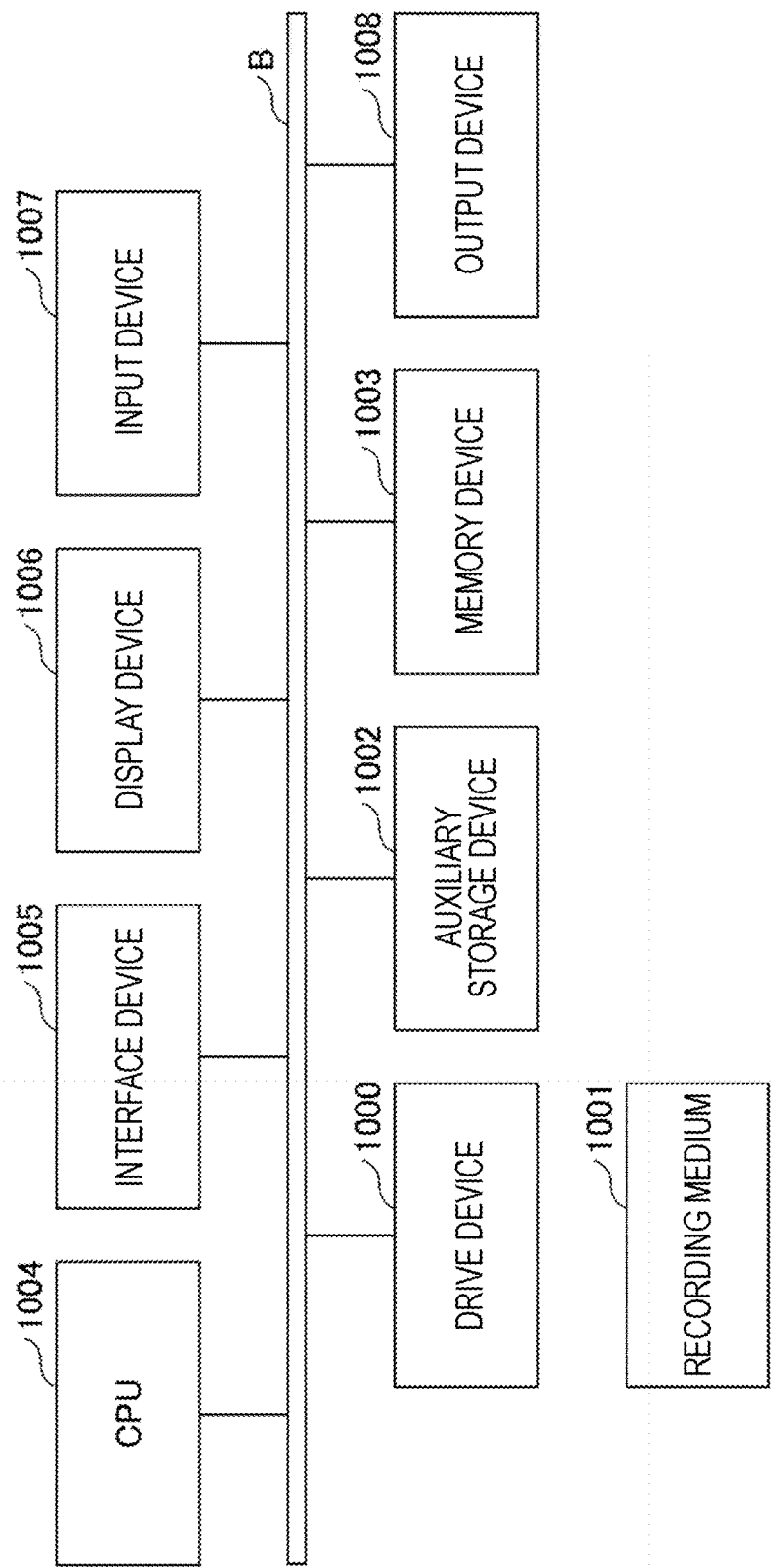
FIG. 6 is a diagram illustrating a hardware configuration example of the apparatus.

FIG. 6 is a diagram illustrating a hardware configuration example of the computer. The computer of FIG. 6 includes a drive device 1000, an auxiliary storage device 1002, a memory device 1003, a CPU 1004, an interface device 1005, a display device 1006, an input device 1007, an output device 1008, and the like which are connected to each other via a bus B. Note that some of these devices may not be included. For example, in a case where display is not to be performed, the display device 1006 may not be included.

The program for implementing the processing in the computer is provided by, for example, a recording medium 1001 such as a CD-ROM or a memory card. When the recording medium 1001 storing the program is set in the drive device 1000, the program is installed from the recording medium 1001 into the auxiliary storage device 1002 via the drive device 1000. Here, the program is not necessarily installed from the recording medium 1001 and may be downloaded from another computer via a network. The auxiliary storage device 1002 stores the installed program and also stores necessary files, data, and the like.

In a case where an instruction to start the program is input, the memory device 1003 reads the program from the auxiliary storage device 1002, and stores the program therein. The CPU 1004 implements a function related to the apparatus in accordance with the program stored in the memory device 1003. The interface device 1005 is used as an interface for connection to a network, and functions as a transmission unit and a reception unit. The display device 1006 displays a graphical user interface (GUI) or the like according to the program. The input device 1007 includes a keyboard and a mouse, buttons, a touch panel, or the like, and is used to input various operation instructions. The output device 1008 outputs a computing result.

Example of Application Field

The technique described in the present embodiment can be applied to various use cases. Examples of use cases are listed as follows.

Traffic flow simulator (http://www.jste.or.jp/sim/models/index.html)
Human simulator (https://info.hitachi-ics.co.jp/product/h_flow/)
Heart simulator (https://blog.global.fujitsu.com/jp/2018-05-10/01/)
Brain simulator (https://bicr.atr.jp/cbi/research-ja/%E8%84%B3%E6%B4%BB%E5%8B%95%E8%A8%88%E6%B8%AC %E3%83%87%E 3%83%BC %E3%82%BF %E3%82%B7%E3%83%9F%E3%83%A5%E3%83%AC %E3%83% BC%E3%82%BF/)
Material physical properties simulator (https://www.jsol-cae.com/product/material/jocta/)
Robot simulator (http://www.idec-fs.com/robodk/)
FPGA simulator (https://www.intel.co.jp/content/www/jp/ja/software/programmable/quartus-prime/model-sim.html)
Space simulator (http://www.astro.phys.s.chiba-u.ac.jp/netlab/astro/index2.html)
Virtual pet (https://www.discoverychannel.jp/0000007144/)
Speech synthesis (https://cloud.google.com/text-to-speech?hl=ja)

Effects of Embodiments

As described above, according to the technique of the present embodiment, there is provided a technique for preventing data leakage to a program provider and program leakage to a data holder in a case where a data processing apparatus including a confidential computing mechanism processes data held by the data holder according to a program provided by the program provider.

Summary of Embodiments

The present specification discloses at least a program execution system, a data processing apparatus, a program execution method, and a program described in the following clauses.

(Clause 1)

A program execution system including:
a data holding apparatus;
a program providing apparatus; and
a data processing apparatus that includes a mechanism for performing secret computing in a secure area, in which
the data holding apparatus transmits encrypted data obtained by encrypting data D with a public key PKd of the data holding apparatus to the data processing apparatus,
the program providing apparatus transmits an encrypted program obtained by encrypting a program P with a public key PKp of the program providing apparatus to the data processing apparatus,
the program providing apparatus transmits a secret key SKp encrypted by a first shared key that is shared with the data processing apparatus to the data processing apparatus,
the data processing apparatus generates a first signature by the secret key SKp on behalf of the program providing apparatus and transmits the generated first signature to the data holding apparatus,
the data holding apparatus verifies the first signature using the public key PKp and transmits a secret key SKd encrypted by a second shared key that is shared with the data processing apparatus to the data processing apparatus, and the data processing apparatus computes, in the secure area, a result P(D) by executing the program P obtained by decrypting the encrypted program with the secret key SKp based on the data D obtained by decrypting the encrypted data with the secret key SKd.

(Clause 2)

The program execution system according to Clause 1, in which
the data holding apparatus transmits a second signature for a nonce value by the secret key SKd to the data processing apparatus, and
the data processing apparatus performs verification of the second signature by using the public key PKd, and, in a case where the verification of the second signature is successful, the data processing apparatus generates the first signature on behalf of the program providing apparatus and transmits the generated first signature to the data holding apparatus.

(Clause 3)

A program execution system including:
a data holding apparatus;
a program providing apparatus; and
a data processing apparatus that includes a mechanism for performing secret computing in a first secure area associated with the program providing apparatus and a second secure area associated with the data holding apparatus, wherein
the data holding apparatus transmits encrypted data obtained by encrypting data D with a public key PKd of the data holding apparatus to the data processing apparatus,
the program providing apparatus transmits an encrypted program obtained by encrypting a program P with a public key PKp of the program providing apparatus to the data processing apparatus,
the program providing apparatus transmits a secret key SKp encrypted by a first shared key that is shared with the first secure area to the first secure area,
the data holding apparatus transmits a secret key SKd encrypted by a second shared key that is shared with the second secure area to the second secure area,
the data processing apparatus performs mutual verification of a first signature by the secret key SKp and a second signature by the secret key SKd between the first secure area and the second secure area, and
the data processing apparatus computes, in the first secure area, a result P(D) by executing the program P, obtained by decrypting the encrypted program with the secret key SKp, based on the data D obtained by decrypting the encrypted data with the secret key SKd.

(Clause 4)

The program execution system according to Clause 3, in which
the data processing apparatus computes, in the first secure area, PROOF(P) by a proof-carrying code (PCC) for the program P obtained by decrypting the encrypted program with the secret key SKp in a case where the verification is successful,
the data processing apparatus performs verification of the PROOF(P) in the second secure area, and
the data processing apparatus computes the P(D) in the first secure area in a case where the verification of the PROOF(P) is successful.

(Clause 5)

A data processing apparatus in a program execution system, the program execution system including a data holding apparatus, a program providing apparatus, and the data processing apparatus that includes a mechanism for performing secret computing in a secure area, wherein the data processing apparatus is configured to:
receive, from the data holding apparatus, encrypted data obtained by encrypting data D with a public key PKd of the data holding apparatus;
receive, from the program providing apparatus, an encrypted program obtained by encrypting a program P with a public key PKp of the program providing apparatus;
receive, from the program providing apparatus, a secret key SKp encrypted by a first shared key that is shared with the program providing apparatus;
generate a first signature by the secret key SKp on behalf of the program providing apparatus, and transmit the generated first signature to the data holding apparatus;
receive, from the data holding apparatus in which the first signature is verified by using the public key PKp, a secret key SKd encrypted by a second shared key that is shared with the data processing apparatus; and
compute, in the secure area, a result P(D) by executing the program P, obtained by decrypting the encrypted program with the secret key SKp, based on the data D obtained by decrypting the encrypted data with the secret key SKd.

(Clause 6)

A data processing apparatus in a program execution system, the program execution system including a data holding apparatus, a program providing apparatus, and the data processing apparatus that includes a mechanism for performing secret computing in a first secure area associated with the program providing apparatus and a second secure area associated with the data holding apparatus, wherein
the data processing apparatus is configured to:
receive, from the data holding apparatus, encrypted data obtained by encrypting data D with a public key PKd of the data holding apparatus;
receive, from the program providing apparatus, an encrypted program obtained by encrypting a program P with a public key PKp of the program providing apparatus;
receive, from the program providing apparatus, a secret key SKp encrypted by a first shared key that is shared between the program providing apparatus and the first secure area;
receive, from the data holding apparatus, a secret key SKd encrypted by a second shared key that is shared between the data holding apparatus and the second secure area;
mutually verify a first signature by the secret key SKp and a second signature by the secret key SKd between the first secure area and the second secure area; and
compute, in the first secure area, a result P(D) by executing the program P, obtained by decrypting the encrypted program with the secret key SKp, based on the data D obtained by decrypting the encrypted data with the secret key SKd.

(Clause 7)

A program execution method performed by a program execution system, the program execution system including a data holding apparatus, a program providing apparatus, and a data processing apparatus that includes a mechanism for performing secret computing in a secure area, the program execution method including:

transmitting, via the data holding apparatus, encrypted data obtained by encrypting data D with a public key PKd of the data holding apparatus to the data processing apparatus;

transmitting, via the program providing apparatus, an encrypted program obtained by encrypting a program P with a public key PKp of the program providing apparatus to the data processing apparatus;

transmitting, via the program providing apparatus, a secret key SKp encrypted by a first shared key that is shared with the data processing apparatus to the data processing apparatus;

generating, via the data processing apparatus, a first signature by the secret key SKp on behalf of the program providing apparatus and transmitting the generated first signature to the data holding apparatus;

verifying, via the data holding apparatus, the first signature by using the public key PKp and transmitting a secret key SKd encrypted by a second shared key that is shared with the data processing apparatus to the data processing apparatus; and computing, via the data processing apparatus, in the secure area, a result P(D) by executing the program P, obtained by decrypting the encrypted program with the secret key SKp, based on the data D obtained by decrypting the encrypted data with the secret key SKd. (Clause 8)

A program for causing a computer to function as the data processing apparatus according to Clause 5 or 6.

Although the embodiments are described above, the present invention is not limited to the specific embodiments, and various modifications and changes can be made within the scope of the gist of the present invention described in the claims.

Reference Literature

Reference Literature 1: Necula G. C. "Proof-Carrying Code", 1997.
Reference Literature 2: George C. Neculaand Peter Lee. "Safe, Untrusted Agents using Proof-Carrying Code", 1998.
Reference Literature 3: Yasuyuki Tsukada, "Proof Hiding in Interactive Proof-carrying Code and Its Applications", 2005.

REFERENCE SIGNS LIST

100 Data processing apparatus
200 Data holding apparatus
300 Program providing apparatus
110 Secure area
111 Secure data storage unit
112 Secure processing unit
120 Communication unit
130 Data storage unit
140 Data processing unit
1000 Drive device
1001 Recording medium
1002 Auxiliary storage device
1003 Memory device
1004 CPU
1005 Interface device
1006 Display device
1007 Input device
1008 Output device

The invention claimed is:

1. A program execution system comprising:
a data holding apparatus including a processor and a memory;
a program providing apparatus including a processor and a memory; and
a data processing apparatus that includes a mechanism for performing secret computing in a secure area, the data processing apparatus including a processor and a memory, wherein
the processor of the data holding apparatus is configured to execute instructions stored in the memory of the data holding apparatus to transmit encrypted data obtained by encrypting data D with a public key PKd of the data holding apparatus to the data processing apparatus,
the processor of the program providing apparatus is configured to execute instructions stored in the memory of the program providing apparatus to transmit an encrypted program obtained by encrypting a program P with a public key PKp of the program providing apparatus to the data processing apparatus,
the processor of the program providing apparatus is configured to execute instructions stored in the memory of the program providing apparatus to transmit a secret key SKp encrypted by a first shared key that is shared with the data processing apparatus to the data processing apparatus,
the processor of the data processing apparatus is configured to execute instructions stored in the memory of the data processing apparatus to generate a first signature by the secret key SKp on behalf of the program providing apparatus and transmits the generated first signature to the data holding apparatus,
the processor of the data holding apparatus is configured to execute instructions stored in the memory of the data holding apparatus to verify the first signature by using the public key PKp and transmits a secret key SKd encrypted by a second shared key that is shared with the data processing apparatus to the data processing apparatus, and
the processor of the data processing apparatus is configured to execute instructions stored in the memory of the data processing apparatus to compute, in the secure area, a result P (D) by executing the program P, obtained by decrypting the encrypted program with the secret key SKp, based on the data D obtained by decrypting the encrypted data with the secret key SKd.

2. The program execution system according to claim 1, wherein
the data holding apparatus transmits a second signature for a nonce value by the secret key SKd to the data processing apparatus, and
the data processing apparatus performs verification of the second signature by using the public key PKd, and, in a case where the verification of the second signature is successful, the data processing apparatus generates the first signature on behalf of the program providing apparatus and transmits the generated first signature to the data holding apparatus.

3. A program execution system comprising:
a data holding apparatus including a processor and a memory;
a program providing apparatus including a processor and a memory; and
a data processing apparatus that includes a mechanism for performing secret computing in a first secure area associated with the program providing apparatus and a second secure area associated with the data holding apparatus, the data processing apparatus including a processor and a memory, wherein the processor of the data holding apparatus is configured to execute instructions stored in the memory of the data holding apparatus to transmit encrypted data obtained by encrypting data D with a public key PKd of the data holding apparatus to the data processing apparatus, the processor of the program providing apparatus is configured to execute instructions stored in the memory of the program providing apparatus to transmit an encrypted program obtained by encrypting a program P with a public key PKp of the program providing apparatus to the data processing apparatus, the processor of the program providing apparatus is configured to execute instructions stored in the memory of the program providing apparatus to transmit a secret key SKp encrypted by a first shared key that is shared with the first secure area to the first secure area, the processor of the data holding apparatus is configured to execute instructions stored in the memory of the data holding apparatus to transmit-a secret key SKd encrypted by a second shared key that is shared with the second secure area to the second secure area, the processor of the data processing apparatus is configured to execute instructions stored in the memory of the data processing apparatus to perform mutual verification of a first signature by the secret key SKp and a second signature by the secret key SKd between the first secure area and the second secure area, and the processor of the data processing apparatus is configured to execute instructions stored in the memory of the data processing apparatus to compute, in the first secure area, a result P (D) by executing the program P, obtained by decrypting the encrypted program with the secret key SKp, based on the data D obtained by decrypting the encrypted data with the secret key SKd.

4. The program execution system according to claim 3, wherein the data processing apparatus computes, in the first secure area, PROOF (P) by a proof-carrying code (PCC) for the program P obtained by decrypting the encrypted program with the secret key SKp in a case where the verification is successful, the data processing apparatus performs verification of the PROOF (P) in the second secure area, and the data processing apparatus computes the P (D) in the first secure area in a case where the verification of the PROOF (P) is successful.

5. A data processing apparatus in a program execution system, the program execution system including a data holding apparatus, a program providing apparatus, and the data processing apparatus that includes a mechanism for performing secret computing in a secure area, the data processing apparatus comprising a processor and a memory, wherein the processor is configured to execute instructions stored in the memory to:

receive, from the data holding apparatus, encrypted data obtained by encrypting data D with a public key PKd of the data holding apparatus;

receive, from the program providing apparatus, an encrypted program obtained by encrypting a program P with a public key PKp of the program providing apparatus;

receive, from the program providing apparatus, a secret key SKp encrypted by a first shared key that is shared with the program providing apparatus;

generate a first signature by the secret key SKp on behalf of the program providing apparatus, and transmit the generated first signature to the data holding apparatus;

receive, from the data holding apparatus in which the first signature is verified by using the public key PKp, a secret key SKd encrypted by a second shared key that is shared with the data processing apparatus; and compute, in the secure area, a result P (D) by executing the program P, obtained by decrypting the encrypted program with the secret key SKp, based on the data D obtained by decrypting the encrypted data with the secret key SKd.

6. A non-transitory computer-readable recording medium having computer-readable instructions stored thereon, which, when executed, cause a computer including a memory and processor to function as a data processing apparatus of claim 5.

* * * * *